(12) United States Patent
Syamakumari et al.

(10) Patent No.: US 9,290,601 B2
(45) Date of Patent: Mar. 22, 2016

(54) PROCESS FOR THE PREPARATION OF TUNABLE FLUORESCENT POLYMER COMPOSITION

(71) Applicant: COUNCIL OF SCIENTIFIC & INDUSTRIAL RESEARCH, New Delhi (IN)

(72) Inventors: Asha Syamakumari, Pune (IN); Kaushlendra Kumar, Pune (IN); Anuya Nisal, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/415,192

(22) PCT Filed: Jul. 16, 2013

(86) PCT No.: PCT/IN2013/000440
§ 371 (c)(1),
(2) Date: Jan. 16, 2015

(87) PCT Pub. No.: WO2014/013507
PCT Pub. Date: Jan. 23, 2014

(65) Prior Publication Data
US 2015/0166709 A1    Jun. 18, 2015

(30) Foreign Application Priority Data
Jul. 16, 2012 (IN) ............ 1502/DEL/2012

(51) Int. Cl.
C08F 289/00 (2006.01)
C09B 5/62 (2006.01)
C09K 11/06 (2006.01)
C09B 23/14 (2006.01)
C09B 69/10 (2006.01)
C09B 57/00 (2006.01)

(52) U.S. Cl.
CPC ............. *C08F 289/00* (2013.01); *C09B 5/62* (2013.01); *C09B 23/148* (2013.01); *C09B C09B69/109* (2013.01); *C09K 11/06* (2013.01); *C09K 2211/1416* (2013.01); *C09K 2211/1466*
(Continued)

(58) Field of Classification Search
CPC ...... C09F 289/00; C09K 11/06; C09K 22/14; C09B 5/62; C09B 23/148; C09B 57/00; C09B 69/102; C09B 69/109
USPC ............... 524/556; 424/9.6; 435/272
See application file for complete search history.

(56) References Cited

U.S. PATENT DOCUMENTS

2012/0039813 A1* 2/2012 Tansil .................. A01K 67/04
424/9.6

FOREIGN PATENT DOCUMENTS

WO    WO2009023287         2/2009
WO    WO 2009023287 A1 *  2/2009  ......... C08K 5/0041

OTHER PUBLICATIONS

Diegelmann et al., "One-Dimensional Optoelectronic Nanostructures Derived from the Aqueous Self-Assembly of π-Conjugated Oligopeptides", J. Am. Chem. Soc., 2008, 130 (42), pp. 13840-13841.
(Continued)

*Primary Examiner* — Michael M Bernshteyn
(74) *Attorney, Agent, or Firm* — K & L Gates LLP (57) ABSTRACT

Disclosed herein is a tunable fluorescent polymer composition comprising silk and one or more polymerizable monomer provided with fluorescent probe, wherein, the said one or more polymerizable monomer provided with fluorescent probe is grafted onto the silk backbone at the a-position of the amide useful in optoelectronics.

7 Claims, 10 Drawing Sheets

(52) U.S. Cl.
CPC ..... (2013.01) 57/001 (2013.01); *C09B 69/102* (2013.01);

(56) References Cited

OTHER PUBLICATIONS

Yaron Tidhar et al. "Pathway-Dependent Self-Assembly of Perylene Diimide/Peptide Conjugates in Aqueous Medium", Chemistry—A European Journal, vol. 17, No. 22, May 23, 2011, 17,6068-6075.

Rachid Matmour et al., "Oligo( p-phenylenevinylene)-Peptide Conjugates: Synthesis and Self-Assembly in Solution and at the Solid-Liquid Interface", Journal of the American Chem., Oct. 11, 2008.

PCT Search Report and Written Opinion dated Dec. 5, 2013 issued for International PCT Application No. PCT/IN2013/000440 filed Jul. 16, 2013.

\* cited by examiner m=1; PBA-HEMA ester
6; PEGMA-PBA ester

PROCESS FOR THE PREPARATION OF TUNABLE FLUORESCENT POLYMER COMPOSITION

PRIORITY CLAIM AND CROSS-REFERENCE TO RELATED APPLICATIONS

This application claims the benefit under 35 U.S.C. §371 to International Application No. PCT/IN2013/000440 filed on Jul. 16, 2013, which claims priority to Indian Patent Application No. 1502/DEL/2012 filed on Jul. 16, 2012 to which priority is also claimed by the present application. The entire disclosures of said applications are incorporated by reference herein for all purposes.

FIELD OF THE INVENTION

The present invention relates to process for the preparation of tunable fluorescent polymer composition comprising polypeptide and polymerizable monomer provided with fluorescent molecules.

Particularly, present invention relates to tunable fluorescent polymer composition comprising polypeptide and polymerizable monomer provided with fluorescent molecules, where fluorescence of said polymer is tunable.

BACKGROUND OF THE INVENTION

There is an enormous demand for chemical sensors in many areas and disciplines. High sensitivity together with ease of operation is the major issue that need to be addressed in the development of sensors. Fluorescence based sensors appear as most promising for chemical sensing. However, the development of sensors is not trivial; material science, molecular recognition and device implementation are some of the aspects that play a role in the design of sensors. A number of materials such as silica particles, glass and gold surfaces, quantum dots, Langmuir-Blodgett films, vesicles, liposomes, and such like are used combined with many chemical receptors to create sensitive fluorescent materials.

Of late, polypeptides in particular, silk fibre have been used extensively in various bio applications like drug delivery, tissue engineering etc due to its biocompatibility. Several attempts have been reported in literature to improve the fiber properties of silk by grafting with various polymerizable monomers. On the other hand, researchers have tried to make use of the self assembling ability of oligopeptide units to form hierarchical assemblies of conjugated polymers.

Modification of silk to achieve tunability in properties such as mechanical strength, water absorbance, rheological properties and such like have been studied in the past.

Silk combined with plastics or fabricated with other biopolymers for use in the fields of microimaging, biological detection, optoelectronics are also studied.

An article titled "Oligo(p-phenylenevinylene)-Peptide Conjugates: Synthesis and Self-Assembly in Solution and at the Solid-Liquid Interface" by Rachid Matmour, Inge de Cat et al. in Am. Chem. Soc., 2008, 130 (44), pp 14576-14583 disclose synthesis of two oligo(p-phenylenevinylene)-peptide hybrid amphiphiles using solid- and liquid-phase strategies. The amphiphiles are composed of a π-conjugated oligo (p-phenylenevinylene) trimer (OPV) which is coupled at either a glycinyl-alanyl-glycinyl-alanyl-glycine (GAGAG) silk-inspired β-sheet or a glycinyl-alanyl-asparagyl-prolyl-asparagy-alanyl-alanyl-glycine (GANPNAAG) β-turn forming oligopeptide sequence.

An article titled "One-Dimensional Optoelectronic Nanostructures Derived from the Aqueous Self-Assembly of π-Conjugated Oligopeptides" by Stephen R. Diegelmann, Justin M. Gorham, and John D. Tovar demonstrate how small peptide sequences with π-conjugated oligomers can be directly embedded in the backbone, promote assembly into 1-D nanostructures with strong π-π intermolecular electronic communication under completely aqueous and physiologically relevant conditions.

US2012039813 relates to a method for producing luminescent coloured silk fibroin. The invention also relates to the use of luminescent coloured silk fibroin to produce threads, yarns or fabrics and in biomedical applications. US'813 disclose a method in which the silkworms are fed with a luminescent dye which is further degummed to obtain the coloured silk fibroin. The luminescent dye is selected from the group consisting of pyrene derivatives, xanthenes derivatives, cyanine derivatives, napththalene derivatives, coumarin derivatives, oxadiazole derivatives, oxazine derivatives, acridine derivatives, arylmethine derivatives and tetrapyrrole derivatives.

WO2009023287 relate to a composition comprising a fluoroionophore grafted to a self-plasticized polymer matrix. The fluoroionophore is lipophilic and H<+>-selective, namely Nile Blue or an analog. The fluoroionophore is grafted to the matrix via a functional group, wherein the matrix comprises an acrylate copolymer, and the fluoroionophore is covalently linked to the matrix through a functional group on the acrylate copolymer.

However, no attempt has been made to graft silk with π conjugated oligomers and polymer with fluorescent probes for possible application in optoelectronics.

OBJECT OF THE INVENTION

Main object of the present invention is to provide a process for the preparation of polymer composition of polypeptide and fluorescent molecules with the versatility to tune its fluorescent properties.

Another object of the present invention is to provide tunable fluorescent polymer composition comprising of polypeptide and polymerizable monomer provided with fluorescent molecules with the versatility to tune its fluorescent properties.

SUMMARY OF THE INVENTION

Accordingly, present invention provides a process for preparation of tunable fluorescent polymeric composition comprising the steps of:
  i. adding 37 mg/ml of polypeptide solution to the $10^{-2}$ M aqueous solution of $KMnO_4$, $10^{-2}$ M oxalic acid and 0.17 M $H_2SO_4$ in 1:1:1:1 v/v ratio followed by stirring and heating at temperature in the range of 55 to 60° C. until the solution becomes colourless;
  ii. adding 0.1 to 30% of one or more polymerizable monomer provided with fluorophore solution in DMF (dimethyl formamide) to the mixture as obtained in step (i) in the ratio ranging between 0.02 to 0.8 w/w and heating at the same temperature;
  iii. cooling the mixture as obtained in step (ii), extracting the precipitate formed with organic solvent and water to remove all the unreacted monomer and homopolymer, filtering under vacuum and drying;
  iv. soxhylating the dryed mixture as obtained in step (iii) in organic solvent for 2 days to obtain pure tunable fluorescent polymer composition.

In one embodiment of the present invention, polypeptide used is selected from natural macromolecules such as silk, wool cellulose, preferably silk wherein silk is obtained from *Bombyx mori* silk worm having functional group selected from tryptophan, serine, glycinyl and alanyl.

In another embodiment of the present invention, polymerizable monomer provided with fluorescent probe is selected from the group consisting of methacrylates, acrylates, vinyl groups, pyrene, perylene, oligophenylene vinylene or oligothiophene, or combinations thereof.

In yet another embodiment of the present invention, said tunable polymer composition comprises silk with PEG-PBA ester (ester of polyethyleneglycol methacrylate and 1-pyrene butyric acid).

In yet another embodiment of the present invention, said tunable polymer composition comprises silk with perylene containing monomer.

In yet another embodiment of the present invention, said tunable polymer composition comprises silk with oligophenylenevinylene (OPV) containing monomer.

In yet another embodiment of the present invention, organic solvent used is selected from Tetrahydro furan (THF) or chloroform.

In yet another embodiment of the present invention, said tunable polymer composition comprises silk together with pyrene and perylene containing monomers, oligophenylenevinylene (OPV) and perylene containing monomers, pyrene, oligophenylenevinylene (OPV) and perylene containing monomers pyrene monomer, Perylene monomer and oligophenylene vinylene monomer randomly.

In yet another embodiment of the present invention, a tunable fluorescent polymer composition comprising polypeptide and one or more polymerizable monomer provided with fluorescent probe, characterized in that the polymerizable monomer provided with fluorescent probe is grafted onto the silk backbone.

In yet another embodiment of the present invention, said composition is useful in optoelectronic and tracing the chain dynamics of silk as well as its self-organization properties in solution.

BRIEF DESCRIPTION OF THE DRAWINGS

FIG. 9: a) Absorbance spectrum and b) emission spectrum of the ungrafted silk. The silk has tryptophan moieties in it's backbone which shows absorption in the region 275 nm and by excitation at 275 nm, the emission spectrum was collected.

FIG. 10: a) Absorbance and b) emission and excitation spectra of pyrene grafted polymer for 0.1 OD solution at pyrene absorption maximum in water of example 1. Pyrene shows the absorbance maximum at ~350 nm due to S2-S0 transition. The emission spectrum was recorded by exciting the solution at pyrene absorbance maximum. The emission spectra clearly showed the pyrene monomer emission in the region 375-420 nm along with the pyrene excimer emission in the region 425-600 nm for both grafted polymers. Figure also shows the excitation spectrum recorded for pyrene emission maximum which highlights the details of emitting species.

FIG. 11: a) Absorbance and b) emission and excitation spectra of oligophenylenevinylene (OPV) grafted polymer for 0.1 OD solution at OPV absorption maximum in water. The emission spectrum recorded by exciting at OPV absorption maximum and the excitation spectrum was collected for emission maximum.

FIG. 12: a) Absorbance and b) emission spectra of perylene grafted polymer for 0.1 OD solution at perylene absorption peak in water.

FIG. 16: a) Emission spectrum of 0.1 OD solution of pyrene grafted silk in water-methanol combination (v/v). b) IE/IM plot as a function of methanol % showing the conformational changes. The methanol is known to bring the conformation changes to the silk backbone ((Ref: *Soft Matter,* 2009, 5, 2777-2781). In water the silk remains mostly in amorphous state and on addition of methanol the β-sheets start forming. The emission spectrum of pyrene-grafted silk was recorded at exciting wavelength of 343 nm for the 0.1 OD solution by varying the methanol-water ratio. The conformational changes were studied by the IE/IM ratio as a function of methanol percentage.

FIG. 17: a) Emission spectrum of dropcasted films of 0.1 OD solution of pyrene grafted silk in water-methanol combination (v/v). b) IE/IM plot as a function of methanol % in the dropcasted films showing the conformational changes. The 0.1 OD solution having different methanol amount were dropcasted to study the conformational changes in the film state and the IE/IM plot was used to notice the conformational changes.

DETAILED DESCRIPTION OF THE INVENTION

The term 'fluorescent probes' or 'fluorophores' as used herein in the specification mean and refer to the groups that impart fluorescence to the polymer of the invention which is tunable.

The present invention aims to modify silk for self-assembling π conjugated oligomers and polymers for potential application in optoelectronics. It also aims to use fluorescently labeled silk to help trace the chain dynamics of silk as well as its self-organization properties in solution.

Accordingly, the present invention discloses polymer composition comprising of a polypeptide and polymerizable monomers provided with Fluorophores the flourescence of such polymers of the invention are tunable.

The polymerizable monomer with Fluorophores is selected from the group consisting of but not limited to methacrylates, acrylates, vinyl groups, pyrene, perylene, oligophenylene vinylene, oligothiophene, alone or in combinations thereof.

The fluorescent probes comprise functional groups selected from, but not limited to —OH, —COO, —CH), and —NH2, either alone or in combination thereof.

The polypeptide is selected from natural macromolecules such as silk, wool cellulose, preferably silk. The silk is obtained from *Bombyx mori* silk worm having functional group selected from tryptophan, serine, glycinyl, alanyl and such like.

The polymerizable monomers are grafted onto silk resulting in different colored emission. The emission color can be fine-tuned by varying the extent of incorporation of the different fluorophores.

Thus, present invention disclose a tunable fluorescent polymer composition comprising silk and one or more polymerizable monomer provided with fluorescent probe, characterized in that the said one or more polymerizable monomer provided with fluorescent probe is grafted onto the silk backbone.

In another aspect, the present invention relate to process for preparation of tunable polymer comprising grafting of polymerizable monomers provided with fluorescent probe in said silk fibroin in aqueous medium using $KMnO_4$-oxalic acid redox system.

The process steps include:
1. adding to the aqueous solution of KMnO4, oxalic acid and H2SO4 a known concentration of silk solution followed by stirring and heating until the solution becomes colourless;
2. adding one or more polymerizable monomer provided with fluorophore to the above mixture and heating at the same temperature;
3. cooling the mixture and extracting the precipitate formed with organic solvent and water to remove all the unreacted monomer and homopolymer, filtering under vacuum and drying; and
4. subjecting the polymer further to soxhylation in organic solvent for 2 days to completely remove the unreacted monomers and homopolymers.

According to the process, to a two necked round bottom flask fitted with stirrer and temperature controlled bath an aqueous solutions of $10^{-2}$ M KMnO4, $10^{-2}$ M Oxalic acid and 0.17 M H2SO4 is added silk solution of known concentration and the mixture is stirred until the solution became colorless. Round bottom flask containing the reaction mixture is immersed in an oil bath having preset temperature ~55° C. After the solution became colorless one or more monomer provided with fluorophore of known amount is added to the reaction vessel. The reaction is maintained for about 3-5 hours at 55° C. The reaction contents are cooled and the yellow precipitate obtained is extracted in organic solvent to remove all the unreacted monomer and homopolymer and is separated using separating funnel. The process is repeated for three times. The residue is further extracted with hot water to remove all the water soluble impurities. The contents are filtered under vacuum and dried under atmospheric condition and weighed. The polymers are subjected to soxhylation in chloroform for about 2 days to completely remove the unreacted monomers and homopolymers.

Figure 1:
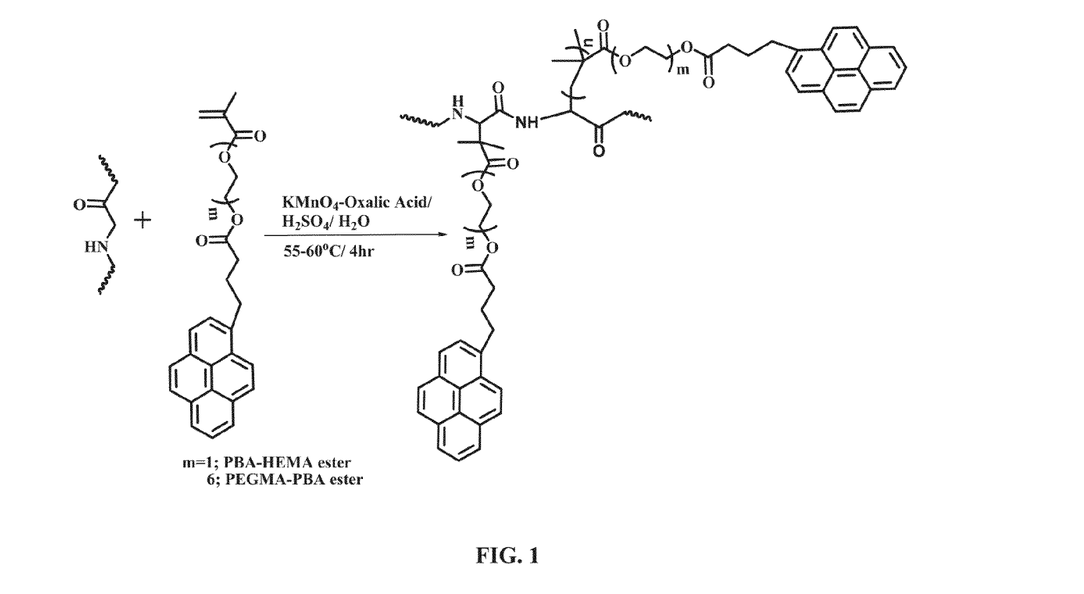
FIG. 1 represents grafting of silk (polypeptide) with one monomer e.g. PEGMA-PBA ester (ester of polyethyleneglycol methacrylate and 1-pyrene butyric acid) or PBA-HEMA (ester of 2-hydroxyethyl methacrylate and 1-pyrene butyric acid).
Figure 2:
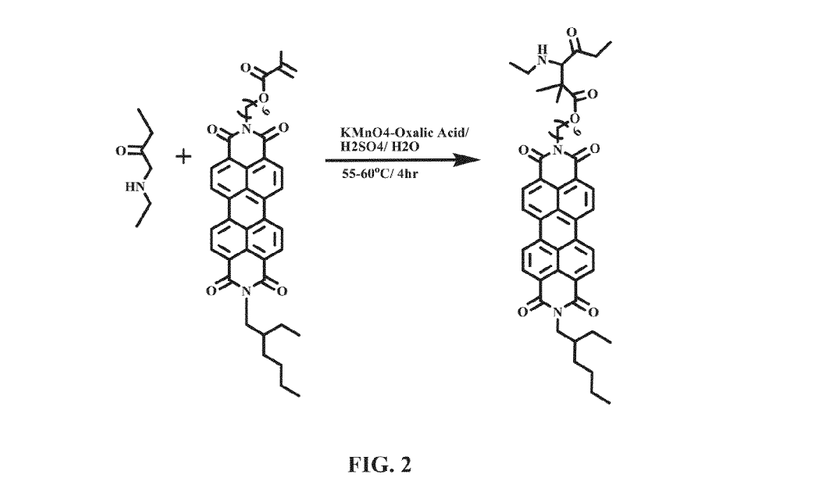
FIG. 2 represents schematic representation of grafting on silk (polypeptide) with perylene containing polymerizable monomer.
Figure 3:
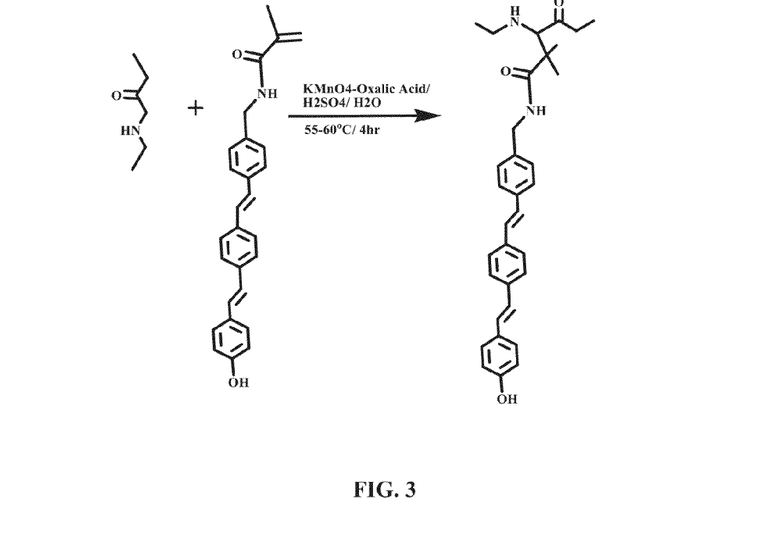
FIG. 3 represents schematic representation of grafting on silk with oligophenylenevinylene (OPV) containing polymerizable monomer.
Figure 4:
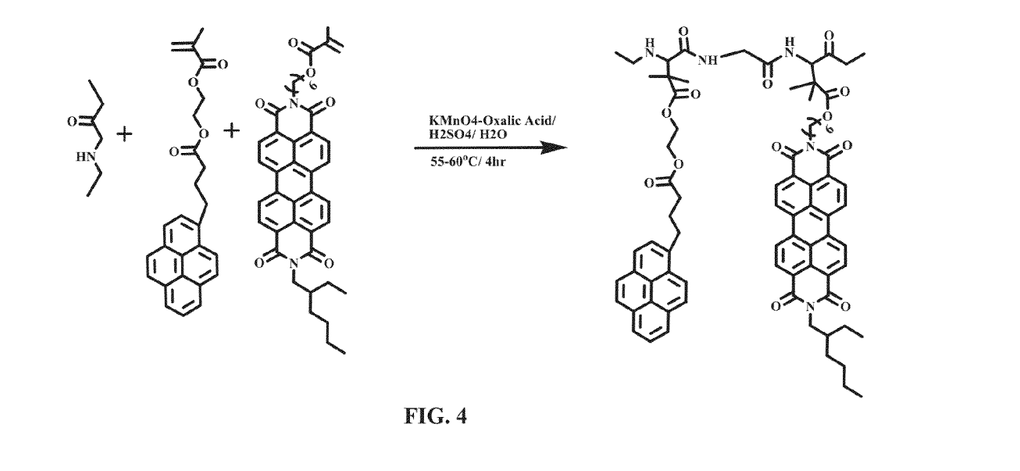
FIG. 4 represents schematic representation of grafting on silk with both pyrene and perylene containing polymerizable monomers together.
Figure 5:
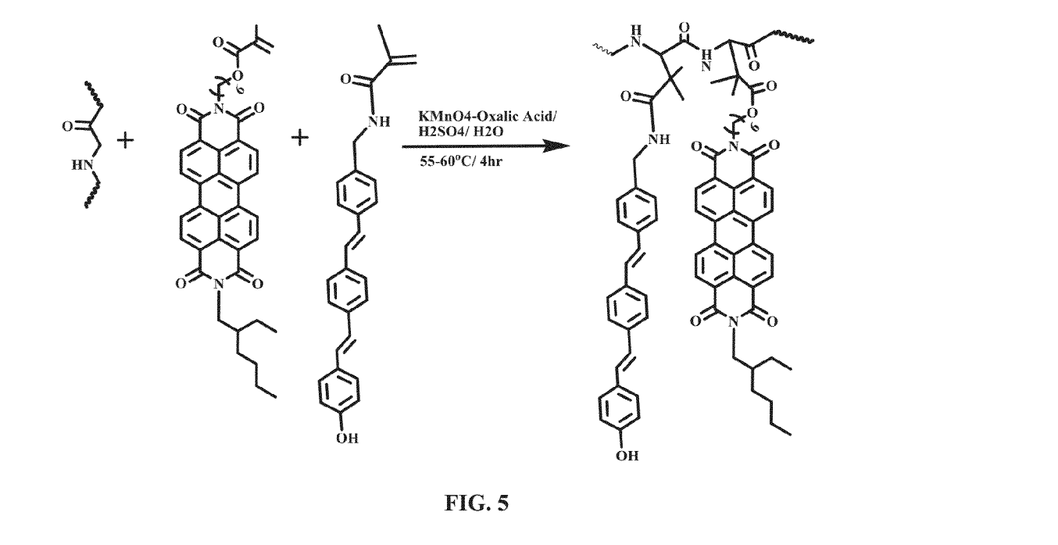
FIG. 5 represents schematic representation of grafting on silk with both oligophenylenevinylene (OPV) and perylene containing polymerizable monomers together.
Figure 6:
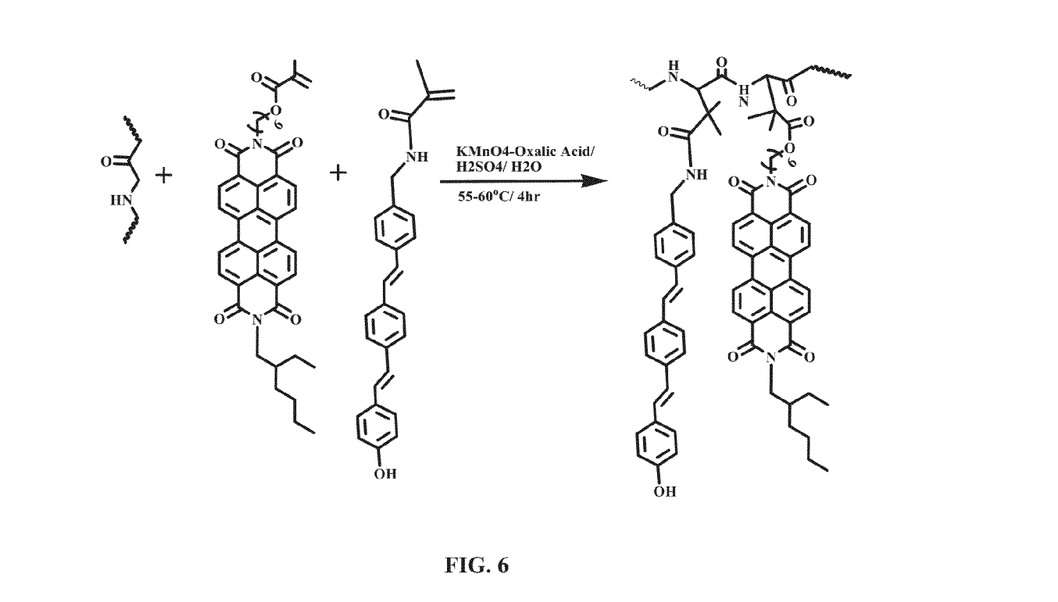
FIG. 6 represents grafting of silk with pyrene monomer, Perylene monomer and oligophenylenevinylene monomer randomly.
Figure 7:
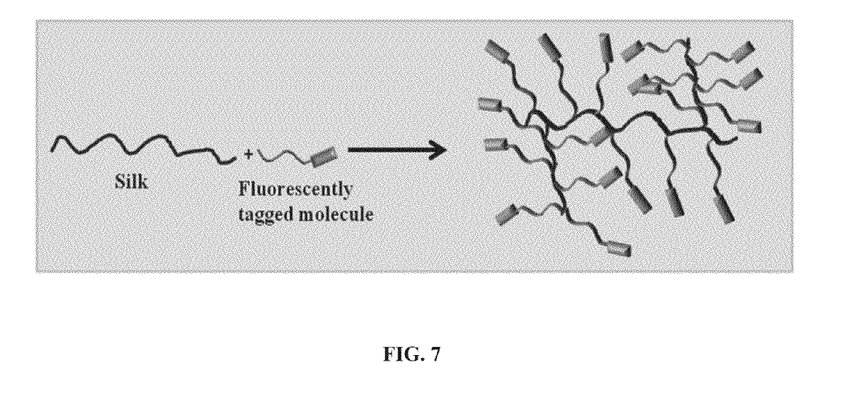
FIG. 7 represents grafting of silk with one monomer eg. PBA-HEMA (ester of 2-hydroxyethyl methacrylate and 1-pyrene butyric acid).
Figure 8:
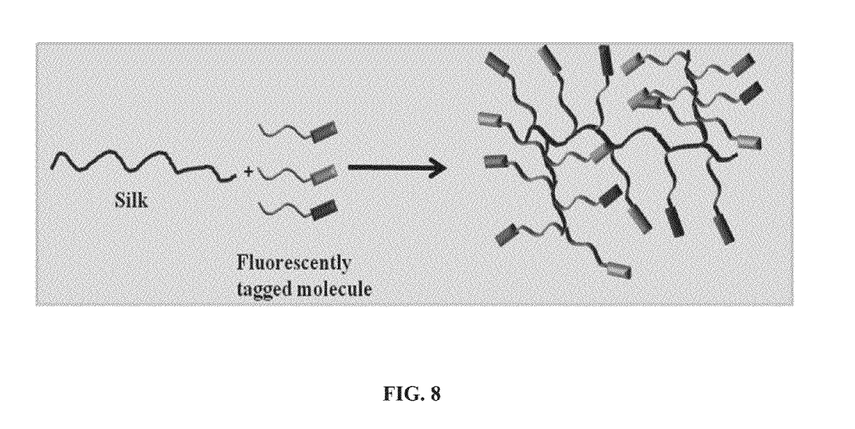
FIG. 8: Schematic representation of grafting of silk with more than one monomer. It may be a combination of monomers such as OPV-Perylene, pyrene-Perylene, OPV-pyrene and perylene.

In an aspect, the present invention provides grafting of silk with one monomer e.g. PEG-PBA ester (ester of polyethyleneglycol methacrylate and 1-pyrene butyric acid) or PBA-HEMA (ester of 2-hydroxyethyl methacrylate and 1-pyrene butyric acid) as mentioned in scheme 1.

In another aspect the present invention provides grafting of individual fluorophores as a pendant to the polymerizable monomers with fluorophore at the silk backbone either alone or in combination as shown in Schemes 2-6.

The absorbance spectrum of the pyrene grafted polymers are recorded in water (optical density is maintained as 0.1 OD). The polymers show the characteristic peaks for the pyrene at 350, 332 and 325 nm which confirms for grafting of the fluorophore onto the silk backbone.

Figures 16A, 16B:
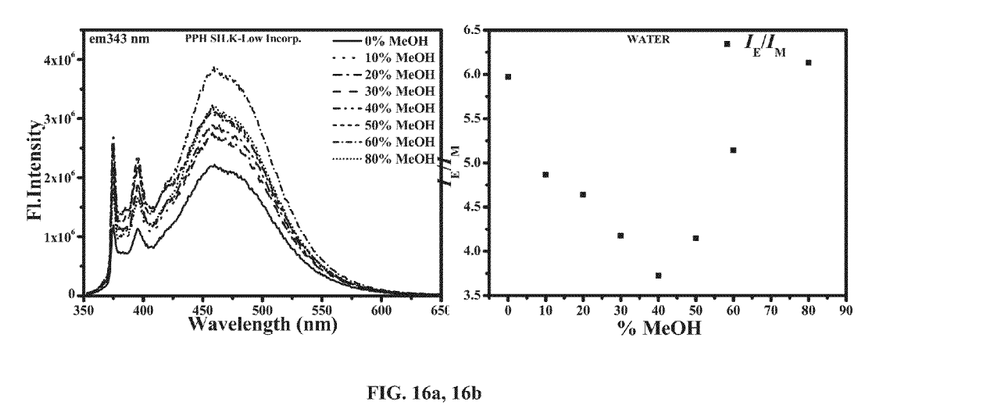
Figures 17A, 17B:
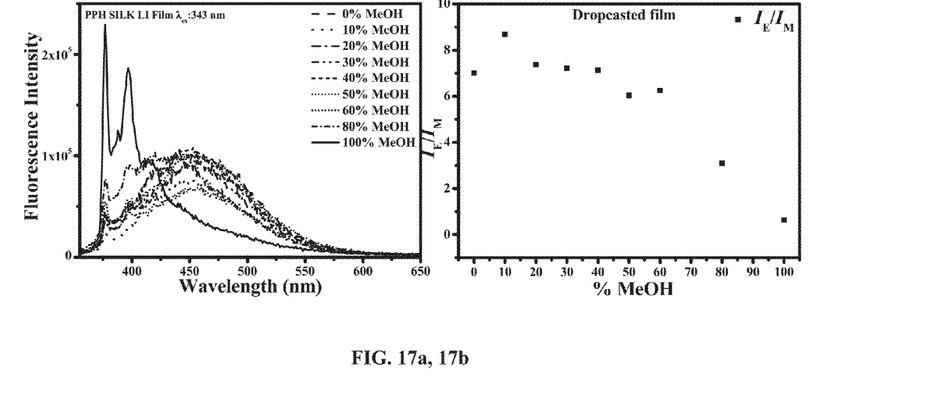

The emission spectrum of pyrene-grafted silk is recorded at exciting wavelength of 343 nm for the 0.1 OD solution by varying the methanol-water ratio. The conformational changes were studied by the IE/IM ratio as a function of methanol percentage. (FIGS. 16 & 17). The emission spectra clearly show the pyrene monomer emission in the region 375-420 nm along with the pyrene excimer emission in the region 425-600 nm for both grafted polymers. The short methacrylate chain pyrene grafted polymer has higher extent of excimer emission compared to the long oligoethylene glycol methacrylate chain pyrene grafted polymer. The absorbance spectrum showing the characteristic peaks for all three fluorophores as labeled in the spectrum are observed. The oligophenylene vinylene and pyrene absorption overlaps in the region ~360 nm, whereas perylene absorption is seen as a hump in the region 500-565 nm.

Figure 18:
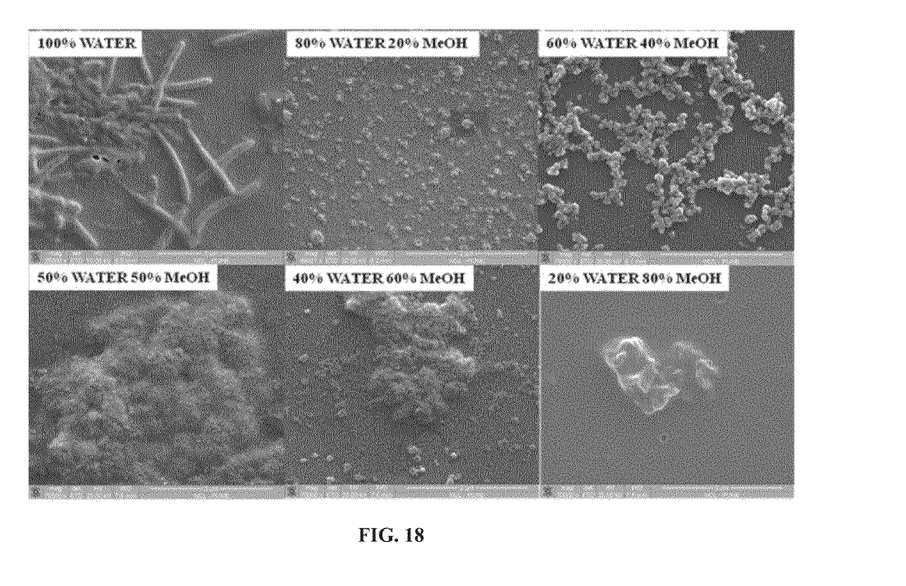
FIG. 18: SEM images highlighting the morphological changes brought about by dropcasting the water-methanol (v/v) solution. The 20 μl of the 0.1 OD solution was dropcasted to observe the morphological changes happening to the dropcasted films with varying methanol amount.
Figure 19:
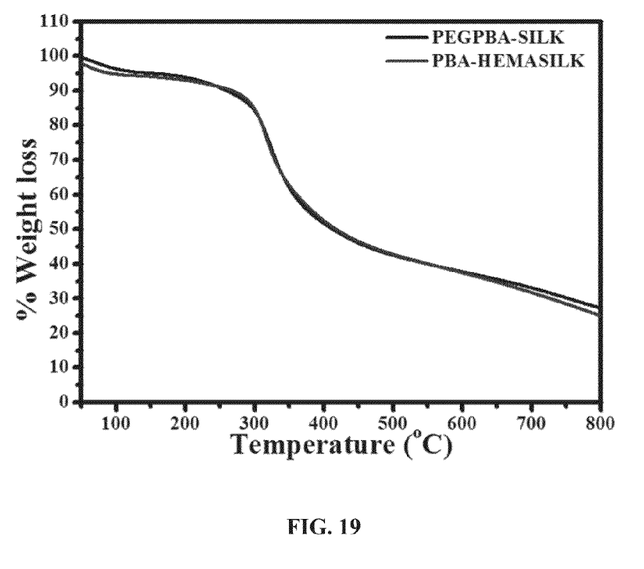
FIG. 19: TGA data of pyrene grafted silk (PEGPBA-silk and PBAHEMA SILK) showing the thermal stability of grafted silk.

Further, the 0.1 OD solution having different methanol amount were dropcasted to study the conformational changes in the film state and the IE/IM plot was used to notice the conformational changes. They were further characterized using SEM (FIG. 18).

The polymer composition comprising modified silk with tunable fluorescence find application in optoelectronic and studies of the microstructure of silk etc.

In another aspect, the present invention provide a method comprising using the tunable polymer composition to help trace the chain dynamics of silk as well as its self-organization properties in solution.

EXAMPLES

Following examples are given by way of illustration therefore should not be construed to limit the scope of the invention.

Example 1

Grafting Process

A two necked round bottom flask fitted with stirrer and temperature controlled bath were used for the reaction. The aqueous solutions of $10^{-2}$ M $KMnO_4$, $10^{-2}$ M Oxalic acid and 0.17 M $H_2SO_4$ were prepared in 100 mL standard measuring flask. 5 ml KMnO$_4$, 5 ml oxalic Acid, 5 ml of 0.17 M H$_2$SO$_4$ and 5 ml of silk solution (concentration: 37 mg/ml water) were added to the R.B and allowed to stir until the solution became colorless. Round bottom flask containing the reaction mixture were immersed in an oil bath having preset temperature ~55° C. After the solution became colorless 150 mg of pyrene methacrylate monomer dissolved in 5 ml of dimethyl formamide (DMF) was added to the reaction vessel. The reaction was allowed to continue for 4 hours at 55° C. After 4 hrs the reaction contents were cooled and the yellow precipitate obtained was extracted with CHCl$_3$ to remove all the unreacted monomer and homopolymer and was separated using separating funnel. The process was repeated three times. The residue was further extracted with hot water to remove all the water soluble impurities. The contents were filtered under vacuum and dried under atmospheric condition and weighed. The polymers were subjected to soxhylation in chloroform for 2 days to remove the unreacted monomers and homopolymers. Yield of the polymer: 65%.

Example 2

Procedure for Grafting Pyrene, Perylene and Oligophenylene Vinylene on Silk

A two necked round bottom flask fitted with stirrer and temperature controlled bath were used for the reaction. The aqueous solutions of 10$^{-2}$ M KMnO$_4$, 10$^{-2}$ M Oxalic acid and 0.17 M H$_2$SO$_4$ were prepared in 100 mL standard measuring flask. 5 ml KMnO$_4$, 5 ml oxalic Acid, 5 ml of 0.17 M H$_2$SO$_4$ and 5 ml of silk solution (concentration: 37 mg/ml water) were added to the R.B and allowed to stir until the solution became colorless. Round bottom flask containing the reaction mixture were immersed in an oil bath having preset temperature ~55° C. After the solution became colorless 5 mg of perylene methacylate monomer, 10 mg of oligophenylene vinylene methacrylate (OPV) monomer and 100 mg of pyrene methacrylate monomer dissolved in 5 ml of dimethyl formamide (DMF) was added to the reaction vessel. The reaction was allowed to continue for 4 hours at 55° C. After 4 hrs the reaction contents were cooled and the yellow precipitate obtained was extracted with CHCl$_3$ to remove all the unreacted monomer and homopolymer and was separated using separating funnel. The process was repeated for three times. The residue was further extracted with hot water to remove all the water soluble impurities. The contents were filtered under vacuum and dried under atmospheric condition and weighed. The polymers were subjected to soxhylation in chloroform for 2 days to remove the unreacted monomers and homopolymers.

Yield of the polymer: 60%.

Example 3

UV and Fluorescence

Figures 9A, 9B:
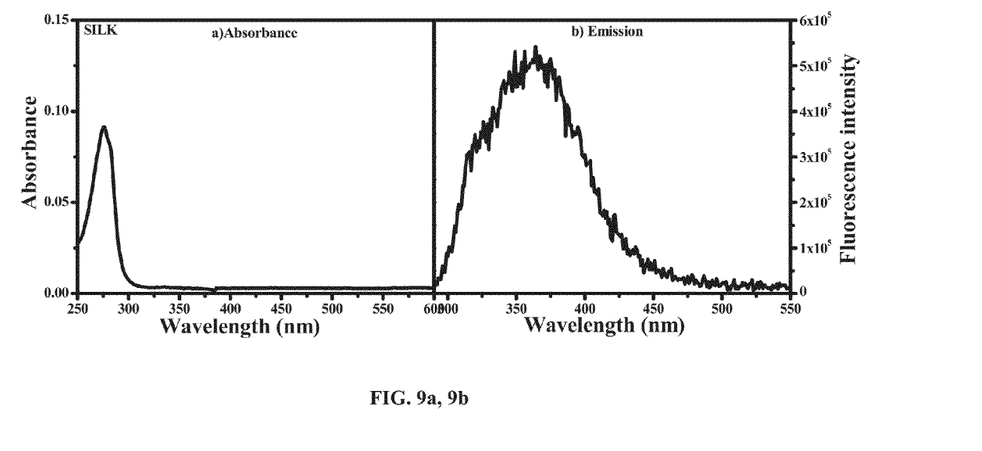
Figures 10A, 10B:
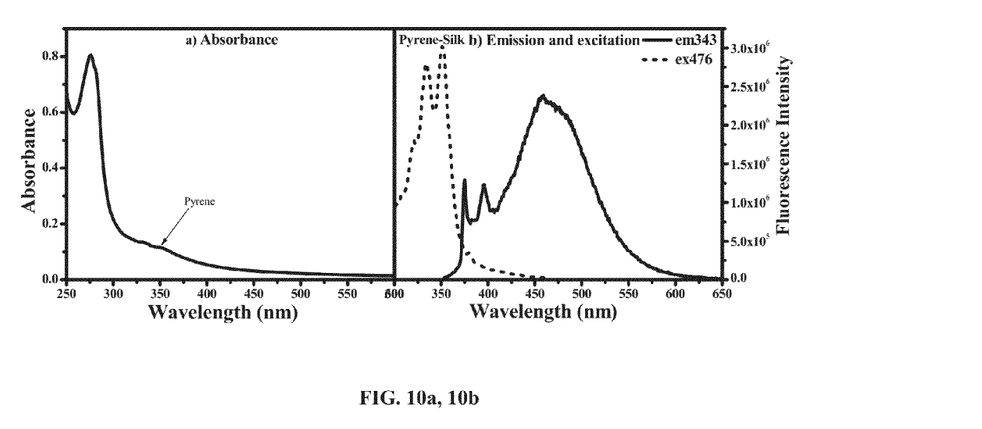

The absorbance spectrum of the pyrene grafted polymers were recorded in water (optical density was maintained as 0.1 OD). The polymers showed the characteristic peaks for the pyrene at 350, 332 and 325 nm giving the proof for grafting of the fluorophore onto the silk backbone. The emission spectrum was also recorded for 0.1 OD solution in water. The emission spectra clearly showed the pyrene monomer emission in the region 375-420 nm along with the pyrene excimer emission in the region 425-600 nm for both grafted polymers. The short methacrylate chain pyrene grafted polymer had higher extent of excimer emission compared to the long oligoethylene glycol methacrylate chain pyrene grafted polymer. The absorbance and the emission spectrum gives the proof of grating on to the silk. (FIG. 9). The absorbance and the emission spectra of only grafted silk is given in FIG. 10.

Figures 11A, 11B:
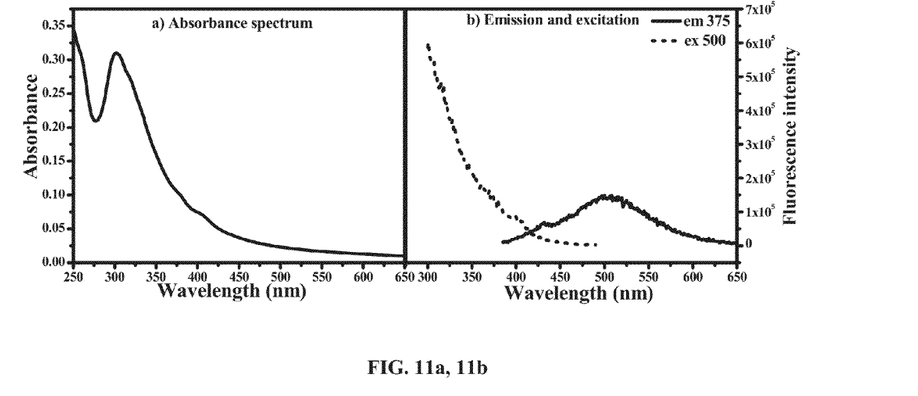
Figures 12A, 12B:
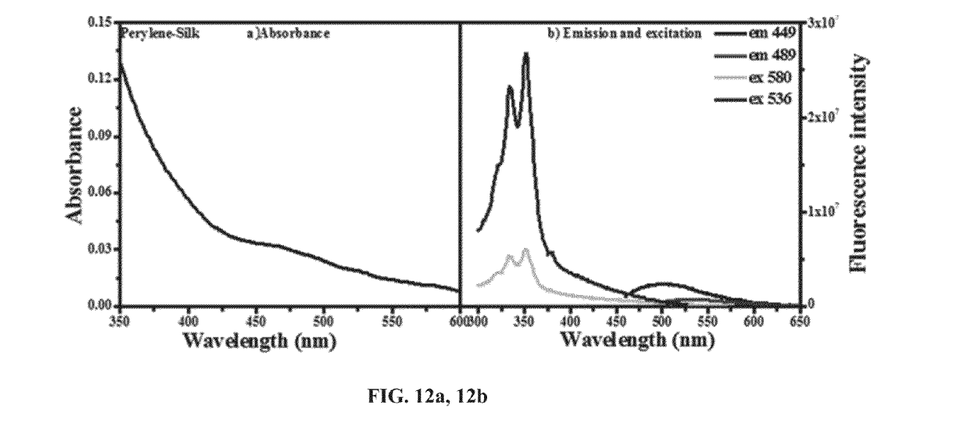
Figure 13:
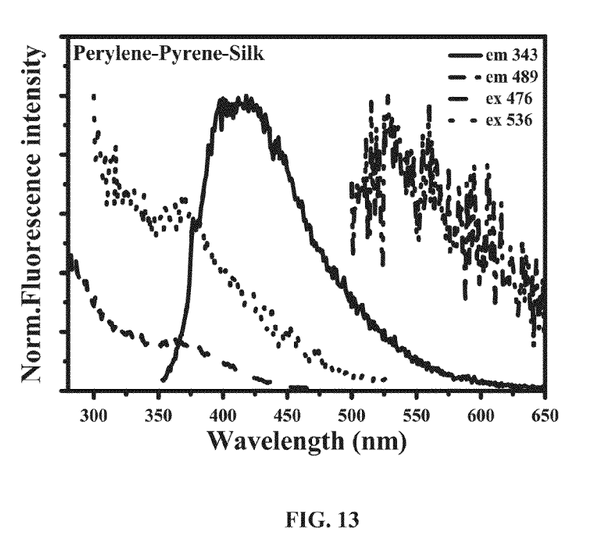
FIG. 13: Normalised emission and excitation spectra of a combination of pyrene and perylene grafted polymer for 0.1 OD solution at pyrene absorption maximum in water.
Figure 14:
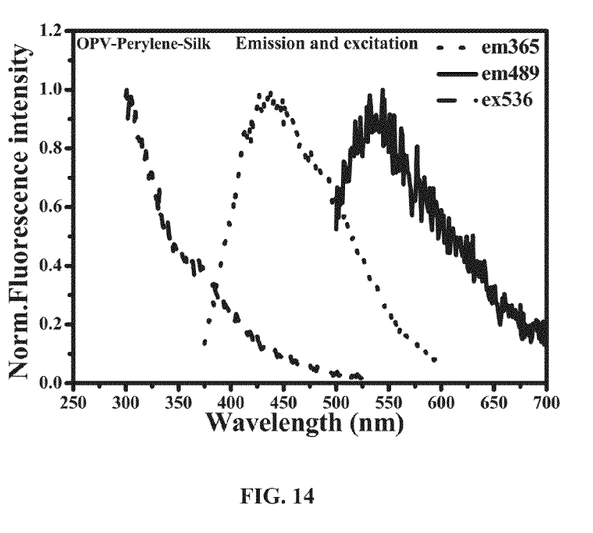
FIG. 14: Normalised emission and excitation spectra of a combination of oligophenylenevinylene (OPV) and perylene grafted polymer for 0.1 OD solution at OPV absorption maximum in water.
Figure 15:
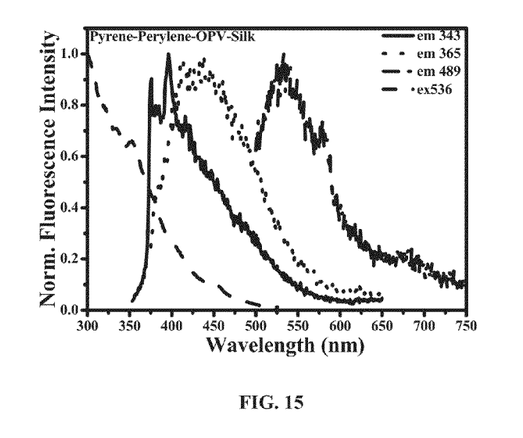
FIG. 15: Normalised emission and excitation spectra of a combination of pyrene, OPV and perylene grafted polymer for 0.1 OD solution at pyrene absorption maximum in water.

With reference to FIG. 11, absorbance spectrum showing the characteristic peaks for all three fluorophores as labeled in the spectrum are seen. The oligophenylene vinylene and pyrene absorption overlaps in the region ~360 nm, whereas perylene absorption is seen as a hump in the region 500-565 nm.

ADVANTAGES OF THE INVENTION

1. The invention provides compositions with fluorescence tunability.
2. The invention provides compositions with immense possibility in applications in optoelectronics.
3. The processes of preparation of compositions with fluorescence tunability are simple and economical.
4. The modified silk fibroin of the present invention is thermally stable.

We claim:

1. A process for preparation of a polymer composition with tunable fluorescence comprising the steps of:
   i. adding 37 mg/ml of silk solution to 10$^{-2}$ M aqueous solution of KMnO$_4$, 10$^{-2}$ M oxalic acid and 0.17 M H$_2$SO$_4$ in 1:1:1:1 v/v ratio followed by stirring and heating at a temperature in the range of from 55 to 60° C. until the solution becomes colourless;
   ii. adding 0.1 to 30% of one or more monomer(s) selected from the group consisting of methacrylates, acrylates, vinyl groups, pyrene, perylene, oligophenylene vinylene, oligothiophene, and combinations thereof provided with fluorophore solution in DMF (dimethyl formamide) to the colourless mixture as obtained in step (i) in a ratio ranging between 0.02 to 0.8 w/w and heating at a temperature of from 55 to 60° C. to obtain a mixture;
   iii. cooling the mixture as obtained in step (ii), extracting the precipitate formed with organic solvent and water to remove all unreacted monomer and homopolymer, filtering under vacuum and drying to obtain a dried mixture; and
   iv. soxhlating the dried mixture as obtained in step (iii) in organic solvent for 2 days to obtain pure polymer composition with tunable fluorescence.

2. The process as claimed in claim 1, wherein the silk used in step (i) is obtained from *Bombyx mori* silk worm having functional group selected from the group consisting of tryptophan, serine, glycinyl, and alanyl.

3. The process as claimed in claim 1, wherein the organic solvent used in step (iii) is selected from the group consisting of tetrahydrofuran (THF), and chloroform.

4. The process as claimed in claim 1, wherein said polymer composition with tunable fluorescence comprises silk with PEG-PBA ester (ester of polyethyleneglycol methacrylate and 1-pyrene butyric acid).

5. The process as claimed in claim 1, wherein said polymer composition with tunable fluorescence comprises silk with perylene containing monomer.

6. The process as claimed in claim 1, wherein said polymer composition with tunable fluorescence comprises silk with oligophenylenevinylene (OPV) containing monomer.

7. The process as claimed in claim 1, wherein said polymer composition with tunable fluorescence comprises silk and one or more monomer(s) selected from the group consisting of pyrene, perylene, perylene containing monomers, oligophenylenevinylene (OPV) and combinations thereof.

* * * * *